C. M. DRINKWATER.
FOOD CABINET.
APPLICATION FILED MAY 22, 1919.
1,336,776.
Patented Apr. 13, 1920.
3 SHEETS—SHEET 3.
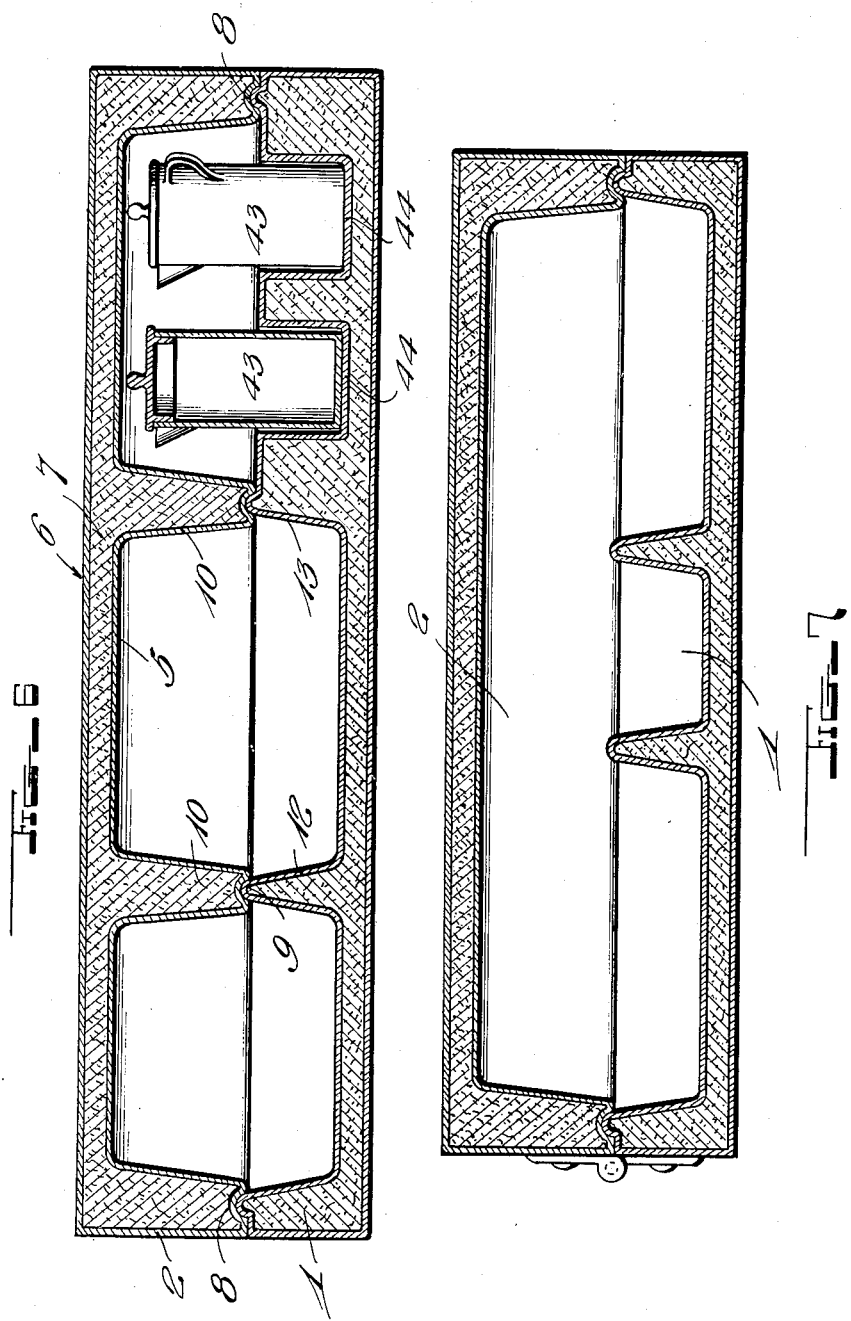
Inventor
Charles M. Drinkwater
By William W. Deane
his Attorney

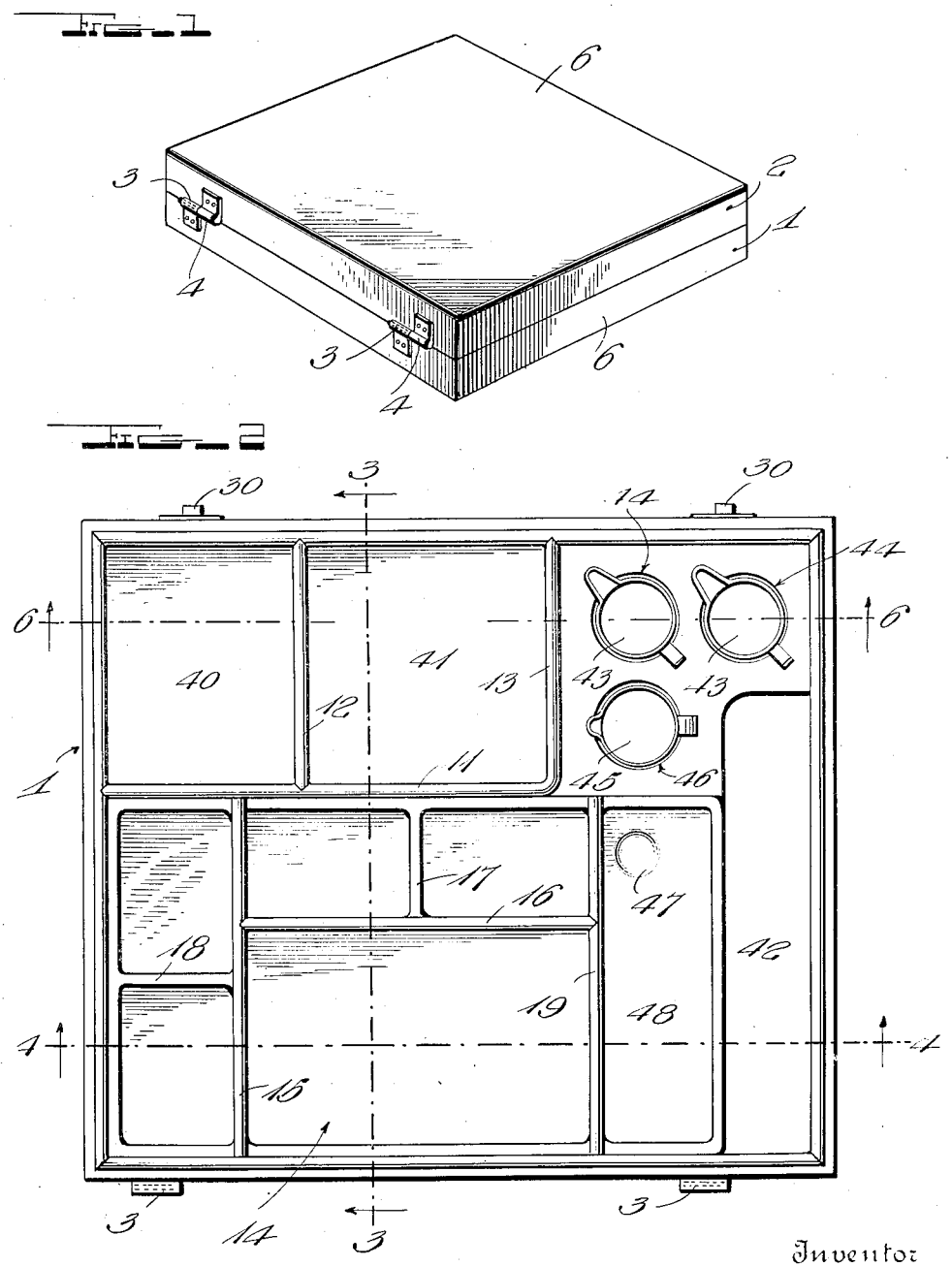

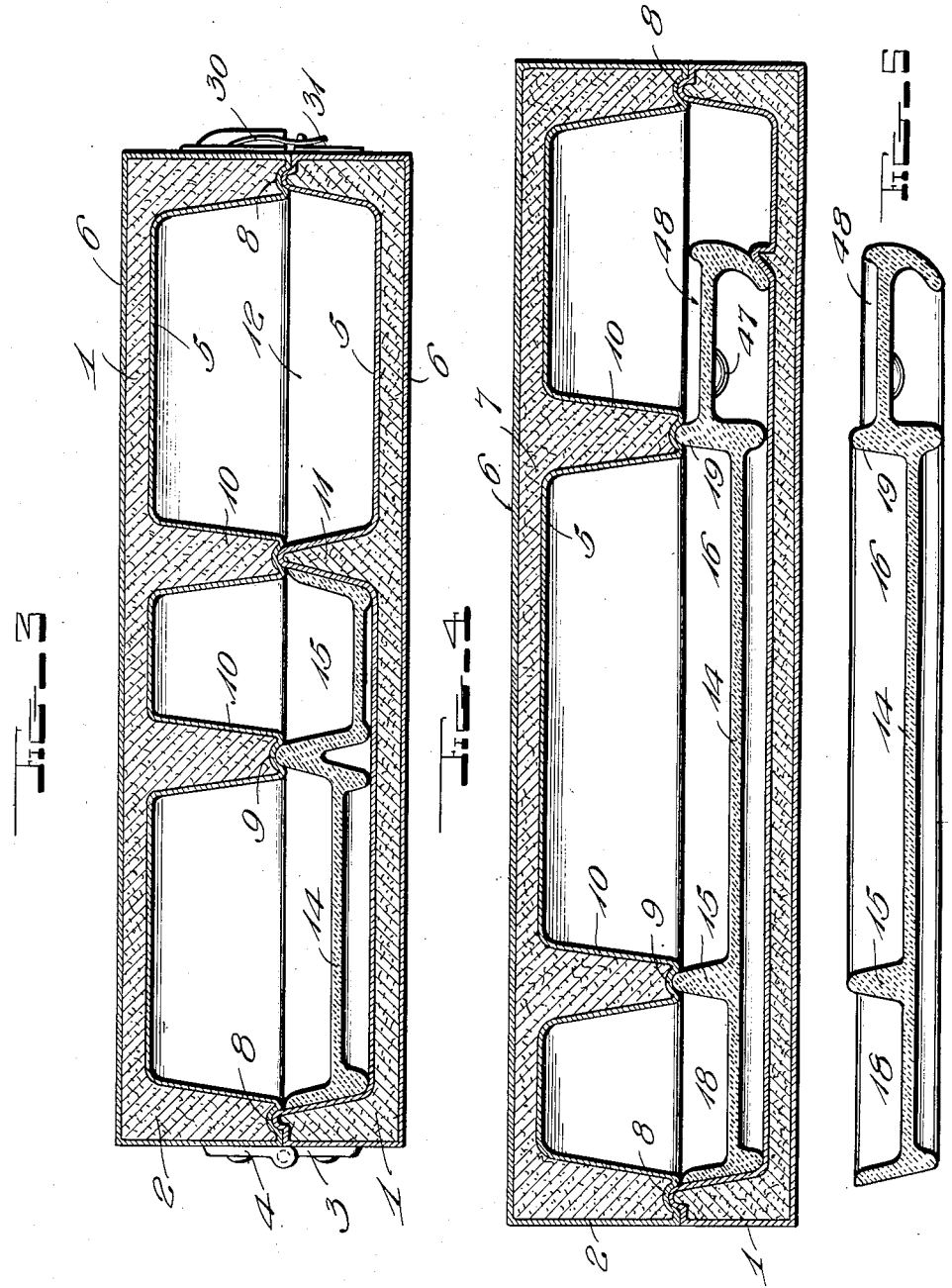

UNITED STATES PATENT OFFICE.

CHARLES M. DRINKWATER, OF KOKOMO, INDIANA.

FOOD-CABINET.

1,336,776.  Specification of Letters Patent.  Patented Apr. 13, 1920.

Application filed May 22, 1919. Serial No. 299,023.

*To all whom it may concern:*

Be it known that I, CHARLES M. DRINKWATER, citizen of the United States, residing at Kokomo, in the county of Howard and State of Indiana, have invented certain new and useful Improvements in Food-Cabinets, of which the following is a specification.

One of the objects of my present invention is the provision of a special diet and room service food cabinet—*i. e.*, a cabinet in which food may be conveniently carried from a kitchen to a room in a hotel or hospital, and this in such manner that the food is preserved in a hot and wholesome state, the dissemination of food odors in halls and corridors is averted, and the commingling of the flavors of the several foods in the cabinet is positively prevented.

Another object of the invention is the provision of a food cabinet comprising a body or base section and a top or cover section; the sections being readily separable so that when the cabinet is carried into a room, the cover section may be removed and conveyed back to the kitchen for use in conjunction with another base section. Manifestly by virtue of this provision an equipment of my novel cabinets may for the sake of economy include less cover sections than base sections.

Another object is the provision of a cabinet of the character defined in which interlocking of the superimposed sections is utilized to serve the two-fold function of isolating the interior of the cabinet from the atmosphere and precluding casual disconnection of the members of the hinge or hinges by which the sections are detachably connected together, so that it is necessary as a condition precedent to separation of the sections of the cabinet to open the same.

Another object is the provision in a cabinet of the character set forth, of a tray effectually held against casual movement in the cabinet when the same is closed and yet adapted when the cabinet is opened, to be readily removed therefrom and to hold several foods in separated relation and in appetizing array.

To the attainment of the foregoing the invention consists in the peculiar cabinet, novel and useful combinations, and the adaptation of elements as hereinafter described and distinctly claimed.

In the accompanying drawings, hereby made a part hereof:

Figure 1 is a perspective showing as closed the cabinet constituting the best practical embodiment of my invention that I have as yet devised.

Fig. 2 is an enlarged plan view showing the base section of the cabinet and the tray nested therein.

Figs. 3 and 4 are sections of the complete cabinet in closed state; Fig. 3 being taken in the plane of the line 3—3, and Fig. 4 in the plane indicated by the line 4—4 of Fig. 2.

Fig. 5 is a longitudinal section of the tray *per se*.

Fig. 6 is a section showing the closed cabinet, said section being taken in the plane indicated by the line 6—6 of Fig. 2.

Fig. 7 is a transverse section taken through a closed cabinet of modified construction.

Similar numerals designate corresponding parts in Figs. 1 to 6 to which reference will first be had.

Among other elements my novel cabinet comprises a hollow base section 1 and a hollow cover section 2. On one of said sections, at one side thereof, are female hinge members 3, and on the corresponding side of the other section are complementary male hinge members 4; the said members being in parallelism to the joint between the sections, and the male members being removably socketed in the female members and so that one may be moved endwise into and out of engagement with the other. Each of the cabinet sections is preferably made up of an inner metallic wall 5 and an outer metallic wall 6, the said walls being spaced apart and receiving between them an insulating filling 7 of any material compatible with the purpose of my invention. As indicated by 8 the joints between the side walls of the sections 1 and 2 are broken to isolate the interior of the closed cabinet from the atmosphere, and as indicated by 9 joints are broken between partitions 10 complementary to the cover section 2 and opposed partitions in the base section 1. In the preferred embodiment of my invention some of the latter partitions are integral with the base section 1, as indicated by 11, 12 and 13 in Figs. 2, 3 and 6, and some are integral with a tray 14 removably nested in the base section 1, as indicated by 15, 16, 17, 18 and 19, Figs. 2–5. By virtue of the breaking of joints between the said partitions of the closed cabinet, commingling of the flavors of the different foods carried in the compartments is precluded which is obviously an important advantage.

The walls 5 and 6 of the sections 1 and 2 are preferably formed of aluminum and are preferably plated with silver or nickel with a view to enhancing the finished appearance of the cabinet and at the same time adapting the sections to be readily and thoroughly cleaned. In the preferred embodiment the tray 14 is formed of porcelain or other vitrified material, though it may be made of any other material compatible with its purpose without affecting my invention.

At the opposite side of the cabinet, with reference to the hinges, I provide the sections 1 and 2 with separable fastener members 30—31 through the medium of which the said sections may be detachably held under pressure against each other when the cabinet is closed and is to be transported from the kitchen to a room in a hospital or hotel.

In the practice of my invention, several foods are placed in the compartments of the tray 14, and bread is placed in the compartment 40, iced fruit or dessert in the compartment 41, tableware in the compartment 42, coffee pots 43 in the pockets 44, and a cup 45 in the pocket 46 of the base section 1. Butter may when desired be placed in the depression 47 in the comparatively shallow compartment 48 at one end of the tray 14. The cabinet is then closed and carried to a room where a meal is to be served, and here the cabinet is opened, and if deemed expedient the cover section 2 may be detached and conveyed back to the kitchen for use in conjunction with another base section. The tray 14 may be used while situated in the base section 1 which may be placed on a suitable support, or, if preferred, the tray 14 may be removed from the base section 1 and used separate therefrom.

It is to be understood that the walls of the sections may be made insulating in character in any approved manner known to those skilled in the art; also, that not only is commingling of the flavors of the several foods in the cabinet precluded but each compartment is insulated from the other, thus rendering feasible the service of an ice-cold food in one compartment and a very hot food or drink in an adjoining compartment for a required length of time.

Having described my invention, what I claim and desire to secure by Letters Patent, is:

1. A cabinet comprising an upper hollow section, a lower hollow section, the engaging edges of said sections having tongue and groove engagement to form an insulating joint, the upper section having partitions, the lower section having partitions to engage with the first named partitions and certain of the partitions of the lower section being embodied in a removable tray arranged within the lower section, and detachable hinges connecting the upper and lower sections.

2. A cabinet comprising opposed hollow sections and having partitioning means in the sections; the joints between the side walls of the sections being broken to isolate the interior of the cabinet from the atmosphere, and the joints between the said partitioning means being broken to segregate compartments within the cabinet from each other.

3. A cabinet comprising opposed hollow sections, and a tray removably disposed in one section; the joints between the side walls of the sections being broken to isolate the interior of the cabinet from the atmosphere, and joints being broken between one section and the tray in the other section to segregate compartments within the cabinet from each other.

4. A cabinet comprising opposed hollow sections, and a tray removably disposed in one section and having partitions dividing it into compartments; the joints between the side walls of the sections being broken to isolate the interior of the cabinet from the atmosphere, and joints being broken between partitions in one section and the partitions of the tray in the other section to segregate compartments within the cabinet from each other.

5. A cabinet having opposed hollow sections and also having partitions in the sections and between which joints are broken when the cabinet is closed to form compartments within the cabinet, segregated from each other.

6. A cabinet having opposed hollow sections and also having partitions in the sections and between which joints are broken when the cabinet is closed to form compartments within the cabinet, segregated from each other; the partitions complementary to one section being comprised in a tray removably arranged in said section.

7. A cabinet comprising upper and lower hollow sections having insulating engaging edges, said upper section having partitions, and a tray removably mounted within the lower section and having partitions which have an insulating engagement with the partition of the upper section, for providing separate compartments.

8. A cabinet comprising superposed hollow sections the outer walls and the partition walls of which are insulating in character and the joints between which walls of the sections are broken to isolate the cabinet interior from the atmosphere and the compartments in the cabinet from each other.

In testimony whereof I affix my signature.

CHARLES M. DRINKWATER.